United States Patent [19]

Horst

[11] 3,951,286

[45] Apr. 20, 1976

[54] HAND TRUCK FORK LIFT

[76] Inventor: Ray J. Horst, 456 W. Calle Lindero, Tucson, Ariz. 85704

[22] Filed: Sept. 19, 1974

[21] Appl. No.: 507,627

[52] U.S. Cl. .................................. 214/370; 187/11
[51] Int. Cl.² .......................................... B62B 1/06
[58] Field of Search ..................... 214/370; 187/11; 280/47.29

[56] References Cited
UNITED STATES PATENTS

| 1,306,431 | 6/1919 | Klemme | 187/11 |
| 1,799,307 | 4/1931 | Manley | 187/11 |
| 2,881,865 | 4/1959 | Lewis | 187/11 X |

FOREIGN PATENTS OR APPLICATIONS

| 28,875 | 1918 | Norway | 187/11 |
| 255,190 | 11/1963 | Australia | 214/370 |
| 649,040 | 9/1962 | Canada | 214/370 |

Primary Examiner—Albert J. Makay

[57] ABSTRACT

This invention relates to equipment utilized to cary loads, and more particularly it is a utility device covering especially improvements in hand truck fork lifts. Inventor realizes that there are already on the market a number of load lifting trucks. However, in his opinion, the marketable types of trucks are too large, too clumsy, cumbersome and complecate in their overall design for the purpose intended. What the applicant has in mind is rather a hand truck fork lift which will be easy to manufacture and to operate permitting the lifting of substantial loads without undue effort on the operator and the development of a torque on the lifting mechanism. One disadvantage of trucks of similar nature already available is the fact that when the load is lifted on a platform, and when the load suddenly shifts, the truck lifting mechanism is unable to balance the load on the platform and the load may drop off the truck and become damaged. Accordingly, one of the main objects on the present invention is to provide a lifting platform which will maintain its own balance at all loads, even though the load has a tendency to shift during the lifting operation.

2 Claims, 6 Drawing Figures

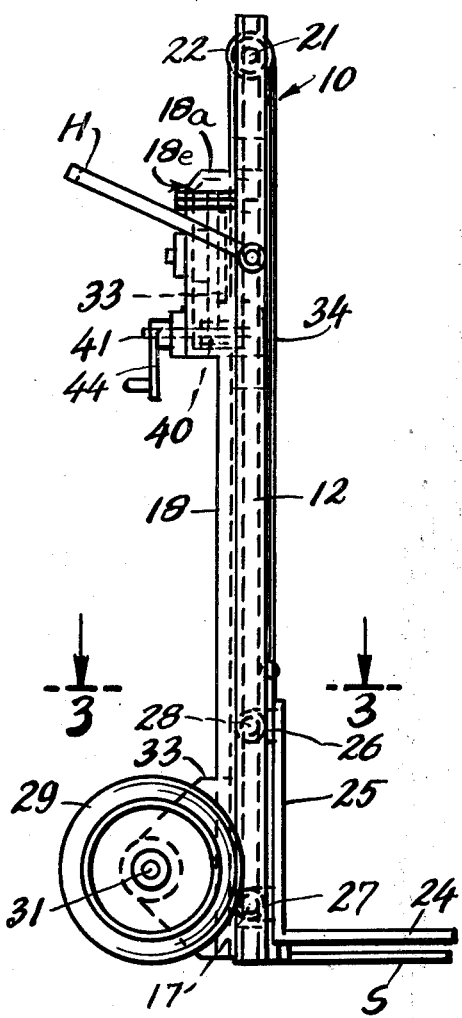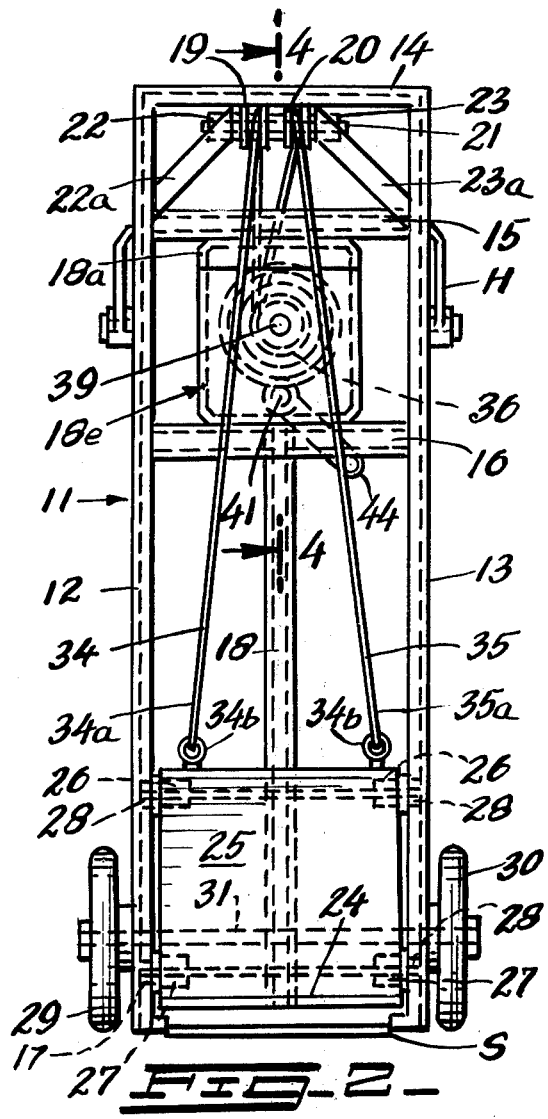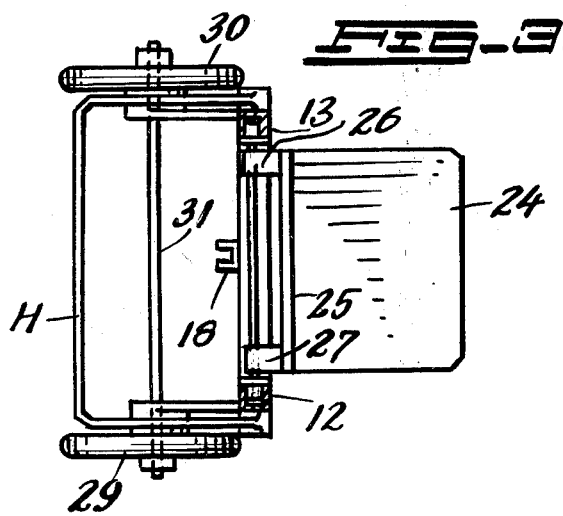

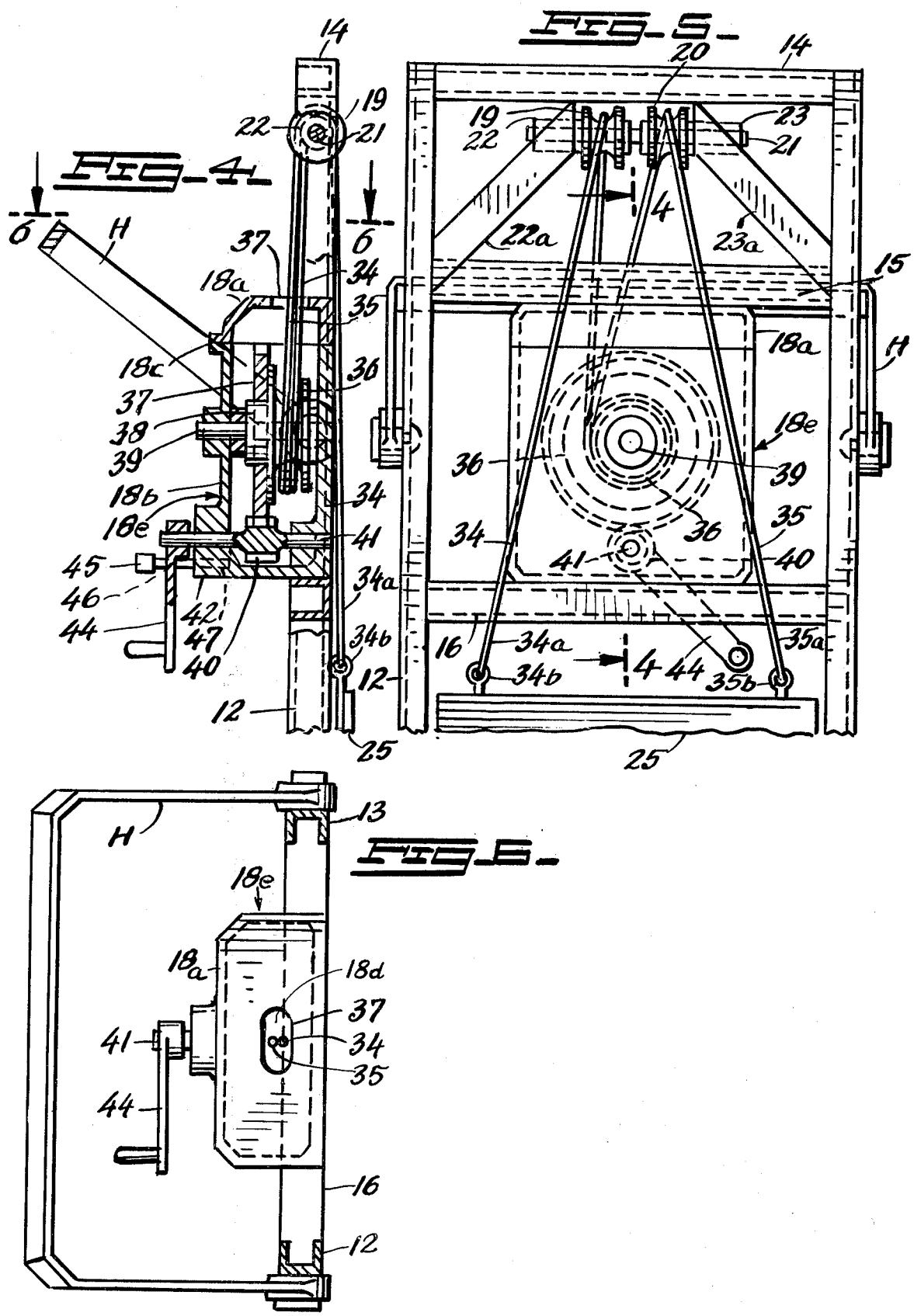

HAND TRUCK FORK LIFT

The present invention comprises a hand truck fork lift for the purpose of carrying loads from one plade to another. The loads are mounted on a platform by hand. These are medium sized loads. However, the construction of this device is such that it may be readily addaptable in lifting heavier loads. There are a number of objects covered by the embodiment of the present invention, and more particularly is the manner in which the steel platform on which the load is mounted is raised by means of a pair of cables instead of by a single cable; one cable lifting one side of the platform and the other cable lifting the opposite side of said platform. Both cables at their other end being fastened to a common winding drum, to permit them to be mound simultaneously so that the load on the platform (in the event it shifts) will not overturn.

Another object of this invention is to provide a drum means on which two separate lifting cables are wound simultaneously.

Another object of the present invention is to provide a gear operable lifting mechanism which will be compact and easy to operate. Said mechanism being entirelly enclosed in a cast-iron or bronze housing. A handle may be provided on the outside, hand operable, for lifting loads mountable on a platform.

A further object of this invention is to provide a frame upon which said lifting mechanism is mounted.

An adfitional object of the present invention is to provide a spring steel stand comprising a plat plate which may be secured to the bottom of the lifting truck. This plate holds the lifting truck upright when the load is being lifted by means of the lifting platform aforesaid.

This invention also contains certain other features of construction and the combination and arrangement of several parts to be hereinafter fully described, and illustrated in the accompanying drawings, and in the specification, and specifically pointed out in the appended claims.

In describing the invention in detail, references will be made to the accompanying drawings where like character numerals denote like and corresponding parts throughout the several views in which:

FIG. 1 is a side elevational view of the general configuration of the hand truck form lift which shows the embodiment of the present invention;

FIG. 2 is a front elevational view showing the lifting mechanism with the pair of lifting cables secured to the lifting platform;

FIG. 3 is a cross-sectional view taken on the line 3—3 of FIG. 2;

FIG. 4 is an enlarged cross-sectional view through the lifting mechanism taken on the line 4—4 of FIG. 2;

FIG. 5 is a front elevational view of FIG. 5; and

FIG. 6 is a cross-sectional view taken on the line 6—6 of FIG. 4.

Referring now more particularly to the design of the hand truck fork lift, best shown in FIG. 1, numeral 10 indicates the general configuration of the device which may be constructed by means of angles and U-shaped extruded beams, preferably of iron or steel, although aluminum also may be used for lightness. The device 11 may be formed by means of a pair of upright frames 12 and 13 of substantial height. At the upper end of the uprights 12 and 13 the latter are joined to one another by means of the bridge section 14. Right under the section 14 there are a pair of secondary bridge sections 15 and 16, respectively. And lastly, at the bottom of the vertical frames the latter are co-joined by the horizontal bridge section 17. A stiffening vertical U-shaped bar 18 is also provided for extra strength. The bar 18 connects the cross pieces 16 and 17, substantially as indicated. The various pieces of the frame may be held or joined to one another by means of rivets, screws or the welding process so as to construct a rigid shutter-proof truck body.

It may be discerned that mounted in between the cross-pieces 15 and 16 there is a cast-iron or bronze body or housing 18e, which by means of screws or welding (not shown) may be regidly secured to the hand truck in the position indicated exactly in the center between the pair of the upright frames 12 and 13. Right over the cast-iron body 18, and particularly above the cross-piece 15, there are provided a pair of cable rollers 19 and 20, with both mounted to rotate upon the common shaft 21, in bearings 22 and 23, respectively. The rollers 19 and 20 can turn freely on the shaft 21 which is keyed, while the bearings 22 and 23 are secured to the frame 11 by means of the pair of inclined steel sections (plates) 22a and 23a, substantially as indicated. The sections 22a and 23a may be fastened to the frame 11 by means of screws or welding (not shown).

From FIG. 2, it may be discerned that the truck is provided with an L-shaped platform 24 which has a vertical extension 25. By means of a pair of bearings 26 and 27, mounted to the vertical sections 25, the two pair of rollers (which are flanged) can readily ride within the U-shaped upright frames 12 and 13; two in the frame 12 and two in the frame 13 (see FIGS. 3 and 6). By means of a cross shaft 31 a pair of wheels 29 and 30 may be mounted to the frame 11 through the medium of the bearing frame extensions 33. The shaft 31 is of substantial length and runs from one wheel to another. However, each wheel is independently mounted as to rotate by itself permitting running around courves as the load is being moved by the truck.

By means of the vertical extension 25 the platform 24 is lifted through the application of a pair of cables 34 and 35. One end 34a and 35a of the cables is anchored to the studs 34b and 35b which are held to either end of the vertical extension 25 of the platform 24, substantially as indicated. The opposide ends of the cables 34 and 35 are secured together and made fast to a cable winding drum 36 which is located inside the cast-iron housing 18.

Referring more particularly to FIGS. 4 and 5, respectively, which show enlarged cross-sectional views taken through the cast-iron housing 18e, one may discern that the latter is formed of the front wall 18a, the rear wall 18b, the bottom section 18c, and the top section 18d. The top section 18d is removable and is mounted to the casting 18e by means of the flanges and screws (not shown). The top section, or the cover, may be provided with an elongated slot or opening 37 which permits the entry of the cables 34 and 35 into the inside of the cast-iron housing where the cable winding drum 36 is located. The drum 36 is mounted or secured by means of screws (not shown) to the large spur gear 37, which in its turn is fastened to the hub 38, mounted on the idler shaft 39. The large gear 37 meshes with the gear pinion 40 which is mounted to an operating shaft stud rotating within the cast iron bearings 42 and 43, respectively. It is, of course, understood that ball bearings may be provided instead for smoother operation. The opposite end of the shaft 41 extends behind and beyond the cast-iron body 18e and its wall 18b, and is machined square. A handle 44 is secured to the square end of the shaft to be turned by hand. Instead of using a ratchet and a ratchet wheel to restrict the operation of the winding mechanism, for simplicity, there is provided a pin 46 which is inserted through a hole 47 in the handle 44, and an opening 48 in the cast-iron frame 18e. The operation of the drun lifting mechanism is simplicity itself. As long as the handle 44 is rotated the pair of the cables 34 and 35 are both being pulled at the same time and both are wound simultaneously on the drum 36 so as to help lift the platform 24 evenly, and substantially as described.

It may be discerned that the truck frame is also equipped with a handle (H) for general purposes, and with a spring steel stand (S) which supports the truck frame upright when the latter is not in use.

A careful examination of the foregoing description in conjunction with this invention as illustrated in the drawings, will enable the reader to obtain a clear understanding and impression of the alleged features of merit and novelty, sufficient to clarify the construction of the invention as hereinafter claimed.

Having now described my invention, what I claim is the following:

1. In a device of the class described, comprising a hand truck fork lift, said device having a rectangular iron frame including a pair of upright supports in parallel spaced apart relation and enjoined by a plurality of transverse cross pieces or spacers, a platform having a plurality of rollers riding along said upright supports, and mechanical means to raise or lower said platform along said frame including a pair of cables, each of which are secured at their one ends to studs mounted on said platform, while the other ends of said cables are fastened to a common winding drum, both said cables having an intermediate portion thereof passed around a pair of pulley-like rollers rotatable about a common horizontal shaft supported at an upper end of said frame, said studs being spaced apart a distance that is several times greater than a distance between said pulley-like rollers, whereby said cables are convergingly inclined from said studs to said pulley-like rollers, the incline of said cables being greatest when said platform is highest elevated, means to wind or unwind said cables on said drum, said cable winding means including a housing in which there is a drum riding upon an idler shaft and a large spur gear, said gear made fast to said drum, and rotating with said drum on said idler shaft, a secondary stud gear meshing with said large gear, said stud gear held to an operating shaft, said shaft running parallel with the shaft on which the drum and the large gear are mounted, and a handle one said secondary shaft, the operation of said handle rotating said stud gear and said large gear, respectably, to wind said pair of cables on said drum to raise or to lower the aforesaid platform.

2. The combination according to claim 1; and a pin provided to restrict the operation of said handle, said handle having an opening, with said cast-iron housing have another opening, being in alignment with the opening in said handle, said pin being inserted into the opening in the handle and made fast in the opening in the cast-iron housing for the purpose of disconnecting the operation of winding said cables, the removal of said pin from said openings in said handle and in said housing making the winding drum again operatively effective.

* * * * *